United States Patent
Taylor

(10) Patent No.: US 8,341,281 B2
(45) Date of Patent: *Dec. 25, 2012

(54) GENERIC COMMUNICATIONS PROTOCOL TRANSLATOR

(75) Inventor: Rebecca S. Taylor, Austin, TX (US)

(73) Assignee: Lubec Campobello LLC, Wilmington, DE (US)

( * ) Notice: Subject to any disclaimer, the term of this patent is extended or adjusted under 35 U.S.C. 154(b) by 112 days.

This patent is subject to a terminal disclaimer.

(21) Appl. No.: 12/875,993

(22) Filed: Sep. 3, 2010

(65) Prior Publication Data

US 2011/0004694 A1   Jan. 6, 2011

Related U.S. Application Data

(63) Continuation of application No. 10/711,173, filed on Aug. 30, 2004, now Pat. No. 7,792,981, which is a continuation of application No. 09/442,683, filed on Nov. 18, 1999, now Pat. No. 6,785,730.

(60) Provisional application No. 60/120,160, filed on Feb. 16, 1999.

(51) Int. Cl.
*G06F 15/16* (2006.01)

(52) U.S. Cl. ........ 709/230; 709/246; 707/708; 707/756; 707/761; 707/706; 707/716; 715/264; 704/2; 704/8

(58) Field of Classification Search .................. 709/230, 709/246, 219, 227, 225, 250
See application file for complete search history.

(56) References Cited

U.S. PATENT DOCUMENTS

| 4,301,443 A | 11/1981 | Sternberg et al. |
| 4,797,842 A | 1/1989 | Nackman et al. |
| 4,821,224 A | 4/1989 | Liu et al. |
| 4,903,026 A | 2/1990 | Tiemann et al. |
| 5,073,852 A | 12/1991 | Siegel et al. |
| 5,410,675 A | 4/1995 | Shreve et al. |
| 5,619,650 A | 4/1997 | Bach et al. |
| 5,655,001 A | 8/1997 | Cline et al. |
| 5,666,553 A | 9/1997 | Crozier |
| 5,680,552 A | 10/1997 | Netravali et al. |
| 5,694,428 A | 12/1997 | Campana, Jr. |
| 5,708,828 A | 1/1998 | Coleman |

(Continued)

FOREIGN PATENT DOCUMENTS

EP   0821507   1/1998

(Continued)

OTHER PUBLICATIONS

Official Action in Japanese Application No. 2000-600172 issued Sep. 15, 2009, 3 pages. English Translation Available, 2 pages.

(Continued)

*Primary Examiner* — Jude Jean Gilles

(57) ABSTRACT

The present invention discloses a generic protocol translator (32) that translates information from a source device to a destination device. The generic protocol translator (32) includes a receiver circuit manager (92) that receives information from a source device that is intended for a destination device through one or more interface sockets (104). The present invention also includes one or more receivers (106) receive information from the receiver circuit manager. Further included are one or more message converters (110) that convert the information to the destination format using a conversion process. Additionally included is a message router (112) that determines which destination protocol is appropriate for the information. And, the present invention includes one or more message senders (114) that transfer the information in the destination format and protocol to the destination device.

22 Claims, 8 Drawing Sheets

U.S. PATENT DOCUMENTS

| | | | |
|---|---|---|---|
| 5,768,603 | A | 6/1998 | Brown et al. |
| 5,771,237 | A | 6/1998 | Kao |
| 5,793,771 | A | 8/1998 | Darland et al. |
| 5,805,832 | A | 9/1998 | Brown et al. |
| 5,845,283 | A | 12/1998 | Williams et al. |
| 5,848,415 | A | 12/1998 | Guck |
| 5,900,023 | A | 5/1999 | Pase |
| 5,912,897 | A | 6/1999 | Steinbach |
| 5,937,408 | A | 8/1999 | Shoup et al. |
| 5,940,598 | A | 8/1999 | Strauss et al. |
| 5,946,634 | A | 8/1999 | Korpela |
| 5,978,858 | A | 11/1999 | Bonola et al. |
| 5,991,292 | A | 11/1999 | Focsaneanu et al. |
| 6,047,002 | A | 4/2000 | Hartmann et al. |
| 6,111,893 | A | 8/2000 | Volftsun et al. |
| 6,128,639 | A | 10/2000 | Pase |
| 6,130,917 | A | 10/2000 | Monroe |
| 6,134,598 | A | 10/2000 | Raman |
| 6,151,390 | A | 11/2000 | Volftsun et al. |
| 6,191,792 | B1 | 2/2001 | Iizuka et al. |
| 6,198,751 | B1 | 3/2001 | Dorsey et al. |
| 6,212,550 | B1 | 4/2001 | Segur |
| 6,278,532 | B1 | 8/2001 | Heimendinger et al. |
| 6,323,881 | B1 | 11/2001 | Broulik et al. |
| 6,356,529 | B1 | 3/2002 | Zarom |
| 6,373,584 | B1 | 4/2002 | Barney et al. |
| 6,404,775 | B1 | 6/2002 | Leslie et al. |
| 6,405,254 | B1 | 6/2002 | Hadland |
| 6,424,830 | B1 | 7/2002 | O'Hagan et al. |
| 6,449,284 | B1 | 9/2002 | Hagirahim |
| 6,487,180 | B1 | 11/2002 | Borgstahl et al. |
| 6,571,308 | B1 | 5/2003 | Reiss et al. |
| 6,594,700 | B1 | 7/2003 | Graham et al. |
| 6,785,730 | B1 * | 8/2004 | Taylor .......... 709/230 |
| 6,976,080 | B1 | 12/2005 | Krishnaswamy et al. |
| 7,072,356 | B1 | 7/2006 | Clancy et al. |
| 7,143,142 | B1 | 11/2006 | Piersol |
| 7,320,001 | B1 | 1/2008 | Chen |
| 7,792,981 | B2 * | 9/2010 | Taylor .......... 709/230 |
| 2001/0012286 | A1 | 8/2001 | Huna et al. |
| 2001/0039540 | A1 | 11/2001 | Hofmann et al. |
| 2002/0004818 | A1 | 1/2002 | Lansio et al. |
| 2002/0037741 | A1 | 3/2002 | Tjalldin et al. |
| 2002/0191574 | A1 | 12/2002 | Taylor et al. |
| 2004/0146057 | A1 | 7/2004 | Yi et al. |
| 2004/0148357 | A1 | 7/2004 | Corrigan et al. |
| 2005/0005022 | A1 | 1/2005 | Taylor |
| 2005/0027870 | A1 | 2/2005 | Trebes, Jr. |
| 2005/0166209 | A1 | 7/2005 | Merrick et al. |
| 2005/0262120 | A1 | 11/2005 | Shoup et al. |
| 2006/0007954 | A1 | 1/2006 | Agrawal et al. |
| 2006/0280360 | A1 | 12/2006 | Holub |
| 2007/0293221 | A1 | 12/2007 | Hwang et al. |

FOREIGN PATENT DOCUMENTS

| | | |
|---|---|---|
| JP | 03-010073 | 1/1991 |
| JP | 04-255136 | 9/1992 |
| JP | 08-070335 | 3/1996 |
| JP | 09-107387 | 4/1997 |
| WO | 98/28892 | 7/1998 |

OTHER PUBLICATIONS

Response to Official Action in Japanese Application No. 2000-600172 filed Mar. 25, 2010, 17 pages.

Official Action in Japanese Application No. 2000-600172 issued Sep. 3, 2010, 2 pages. English Translation Available, 2 pages.

WAP Architecture, "Wireless Application Protocol: Architecture Specification", Wireless Application Protocol Forum, Ltd, Apr. 30, 1998, 20 pages.

WAP WAE, "Wireless Application Protocol: Wireless Application Environment Overview", Wireless Application Protocol Forum, Ltd., Jun. 16, 1999, 26 pages.

WAP WAE Specification, "Wireless Application Protocol: Wireless Application Environment Specification", Wireless Application Protocol Forum Ltd, May 24, 1999, 20 pages.

WAP WML, "Wireless Application Protocol: Wireless Markup Language Specification", Wireless Application Protocol Forum,Ltd., Jun. 16, 1999, 71 pages.

WAP Binary XML Content Format, "Wireless Application Protocol: Binary XML Content Format Specification", Wireless Application Protocol Forum, Ltd., Jun. 16, 1999, 21 pages.

WMLScript Specification, "Wireless Application Protocol: WMLScript Language Specification", Wireless Application Protocol Forum, Ltd., Jun. 17, 1999, 118 pages.

WMLScript Standard Libraries Specification, "Wireless Application Protocol: WMLScript Standard Libraries Specification", Wireless Application Protocol Forum, Ltd., Jun. 17, 1999, 42 pages.

WAP WMLScript Addendum, Wireless Application Protocol: WMLScript Statement of Intent, Wireless Application Protocol Forum, Ltd., Apr. 30, 1998, 2 pages.

WAP Caching Model, "Wireless Application Protocol: Cache Model Specification", Wireless Application Protocol Forum, Ltd., Feb. 11, 1999, 8 pages.

WAP WSP, "Wireless Application Protocol: Wireless Session Protocol Specification", Wireless Application Protocol Forum, Ltd., May 28, 1999, 98 pages.

WAP WTP, "Wireless Application Protocol: Wireless Transaction Protocol Specification", Wireless Application Protocol Forum, Ltd., Jun. 11, 1999, 67 pages.

WAP WDP, "Wireless Application Protocol: Wireless Datagram Protocol Specification", Wireless Application Protocol Forum, Ltd., May 14, 1999, 62 pages.

WAP over GSM USSD, "Wireless Application Protocol: WAP over GSM USSD Specification", Wireless Application Protocol Forum, Ltd., May 31, 1999, 38 pages.

WAP WCMP, "Wireless Application Protocol: Wireless Control Message Protocol Specification", Wireless Application Protocol Forum, Ltd., May 14, 1999, 21 pages.

WAP WTLS, "Wireless Application Protocol: Wireless Transport Layer Security Specification", Wireless Application Protocol Forum, Ltd., Feb. 11, 1999, 89 pages.

WAP WTA, "Wireless Application Protocol: Wireless Telephony Application Specification", Wireless Application Protocol Forum, Ltd., Jul. 16, 1999, 39 pages.

WAP WTAI, "Wireless Application Protocol: Wireless Telephony Application Interface Specification," Wireless Application Protocol Forum, Ltd., May 31, 1999, 36 pages.

WAP WTAI (GSM), "Wireless Application Protocol: Wireless Telephony Application Interface Specification: GSM Specific Addendum", Wireless Application Protocol Forum, Ltd., Feb. 10, 1999, 16 pages.

WAP WTAI (IS-136), "Wireless Application Protocol: Wireless Telephony Application Interface Specification: IS-136 Specific Addendum", Wireless Application Protocol Forum, Ltd., Apr. 30, 1998, 9 pages.

WAP WTAI (PDC), "Wireless Application Protocol: Wireless Telephony Application Interface Specification: PDC Specific Addendum", Wireless Application Protocol Forum, Ltd., Apr. 30, 1998, 12 pages.

U.S. Appl. No. 60/292,524, filed May 23, 2001.

International Search Report application No. PCT/US2000/003912 mailed Jul. 11, 2000.

Concise Explanation of Non-English Language Documents Under 37 C.F.R. § 1.98(a)(3) for NPL Reference 2.

* cited by examiner

GENERIC COMMUNICATIONS PROTOCOL TRANSLATOR

CROSS REFERENCE TO RELATED APPLICATIONS

The present application is a continuation of U.S. application Ser. No. 10/711,173, filed Aug. 30, 2004, now U.S. Pat. No. 7,792,981, which is a continuation of U.S. application Ser. No. 09/442,683, filed Nov. 18, 1999, now U.S. Pat. No. 6,785,730, which claims the benefit of priority to U.S. Provisional Appl. No. 60/120,160, filed Feb. 16, 1999. The disclosures of each of the above-referenced applications are incorporated by reference herein in their entireties.

BACKGROUND OF THE INVENTION

This invention relates to the field of software communications and messaging protocols. More specifically, this invention relates to a method for more robust and efficient interfaces between a broad category of new and existing computing devices connected 1) wirelessly, 2) via serial cables 3) by modem dial-up or 4) by network cabling. Even more specifically, this invention relates to an infrastructure for translation of a configurable set of source and destination attributes such as 1) device type, 2) protocol type, and 3) application data format type utilized by such devices during operation of device-specific applications.

New electronic devices with embedded processing capabilities are continually being developed for various consumer, business, and other industries and applications. Examples of these devices include, but are not limited to, smart-phones, handheld computers and personal data assistants, television set-top boxes, high-definition television, automotive accessories such as real-time GPS navigation systems, security system sensors, and pagers. Each of these devices generally has different communication and data needs and capabilities. As these examples illustrate, the issue of data communication protocols and techniques is no longer limited to the telecommunications, computing, and broadcasting industries.

However, sharing data between these devices is often impossible; in the few cases where sharing is possible, such sharing occurs between two specific devices and usually requires complicated and inconvenient manual intervention. For example, consider the following typical scenario for sharing data between two electronic devices such as those listed above. First, the electronic device user must have a connection to another processing device, typically a Personal Computer (PC). Data to be shared must be copied from the non-PC device to the intervening PC, often by using specialized and proprietary software, then translated into an interim format, and finally, re-copied to the destination device, possibly using yet another proprietary software package to perform the translation. When the data-sending device and the data-receiving device are at two different locations, the Internet is a common vehicle for the data transfer, but this requires PCs with Internet connections and e-mail capabilities at both the data source and the data destination. Under this scenario, the destination PC receives the data (by e-mail attachment, for example) for the data-receiving device, and then conducts its own translation-and-download sequence to get the data onto the destination device. As this example demonstrates, this process usually requires significant human coordination between the source of the data and the destination of that data. Additionally, the source and destination data formats are often discovered to be incompatible when the data is received, rendering the entire transfer attempt useless, and the sharing of data between the source and destination devices impossible.

One solution to this problem is a mechanism or device that can first determine the source and destination device type and data format requirements, and then actually transfer the information from the source to the destination. While there are existing mechanisms known as gateways that perform these functions today, current gateways are highly limited in that they are capable of handling only a specific set (usually a pair) of communications protocols identified for implementation during the gateway design process. Adding support for new protocols and/or data formats to existing gateways often requires significant re-design, upgrades, or modifications, all of which are time-consuming and error-prone.

For example, U.S. Pat. No. 5,793,771 to Darland, et al. describes a telecommunications industry-related gateway that translates the SS7 telecommunications protocol to and from Network Information Distribution Service (NIDS) protocol. Like other gateways, this gateway is not transferable to new protocols utilized in different devices or different industries without significant rework because it was designed to solve a single communications need.

A new solution is therefore required that provides a translator capable of "keeping up" with the constantly-evolving, multi-industry electronic device market without continually requiring upgrades and modification whenever a new device and/or protocol is introduced. The present invention is such a generic communications protocol translator. The present invention determines the source and destination device type and data format requirements, and then handles the information transfer from the source to the destination. The present invention is capable of on-the-fly recognition, categorization, and conversion of various communication protocols by evaluating ten major discriminators. This enables the present invention to recognize and handle future protocols, device types, and application formats without the need for design modifications or upgrades.

SUMMARY OF THE INVENTION

The present invention is a generic protocol translator that translates information from a source device to a destination device. The present invention comprises a receiver circuit manager that further comprises one or more interface sockets, each interface socket is assigned a supported source protocol. The receiver circuit manager receives information from a source device that is intended for a destination device through the interface sockets. The present invention further comprises one or more receivers that receive information from the receiver circuit manager. Additionally, the present invention comprises one or more message converters convert the information to the destination format using a conversion process. The message converters are extensible and can be reprogrammed in the field to support other protocols, device types, and applications. The conversion process uses a poly dimensional finite state automaton that further comprises a multi-stage pipeline comprising a first stage and a plurality of subsequent stages. Each stage of said multi-stage pipeline further comprises a matrix where a result is obtained as a function of one or more input variables, where one of the input variables of each subsequent stage further comprises the result from a prior stage. The present invention additionally comprises a message router that determines which destination protocol is appropriate for the information. And, the present invention includes one or more message senders that transfer the information in the destination format and protocol to the destination device.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

One objective of this invention is to provide a stable interface enabling device vendors and applications developers to interoperate without continuous and expensive modifications to their product line(s). A major advantage of this invention is that it provides just such an interface and infrastructure, which device and application developers can utilize as a service without concerning themselves with the details of what protocol, data format or application semantics will be used by the device with which it intends to share information. This invention provides for incorporation of new protocols and data formats as they become available and of interest, rather than requiring their identification and definition at the outset of the project.

The present invention comprises a method and apparatus that moves information from a source S, to a destination D, where S and D have differing data formats and utilize different protocols at their interfaces. The present invention accepts data from S and determines the source device type having data format $F_s$ and the destination device type having data format $F_d$. The present invention translates the incoming data from $F_s$ to $F_d$, and then transfers the data in new format $F_d$ to D. This disclosure describes specific details, protocol types, and structures to provide a thorough understanding of the present invention. However, as those skilled in the art are familiar with well known software constructs such as records and arrays, those details are not provided herein to avoid obscuring the present invention. Similarly, those skilled in the art of communications protocols are highly familiar with internal protocol formats and details. Therefore, although the present invention supports those protocols and formats, those details are not provided herein. One skilled in the art will appreciate that one may practice the present invention without these specific details.

Figure 1:
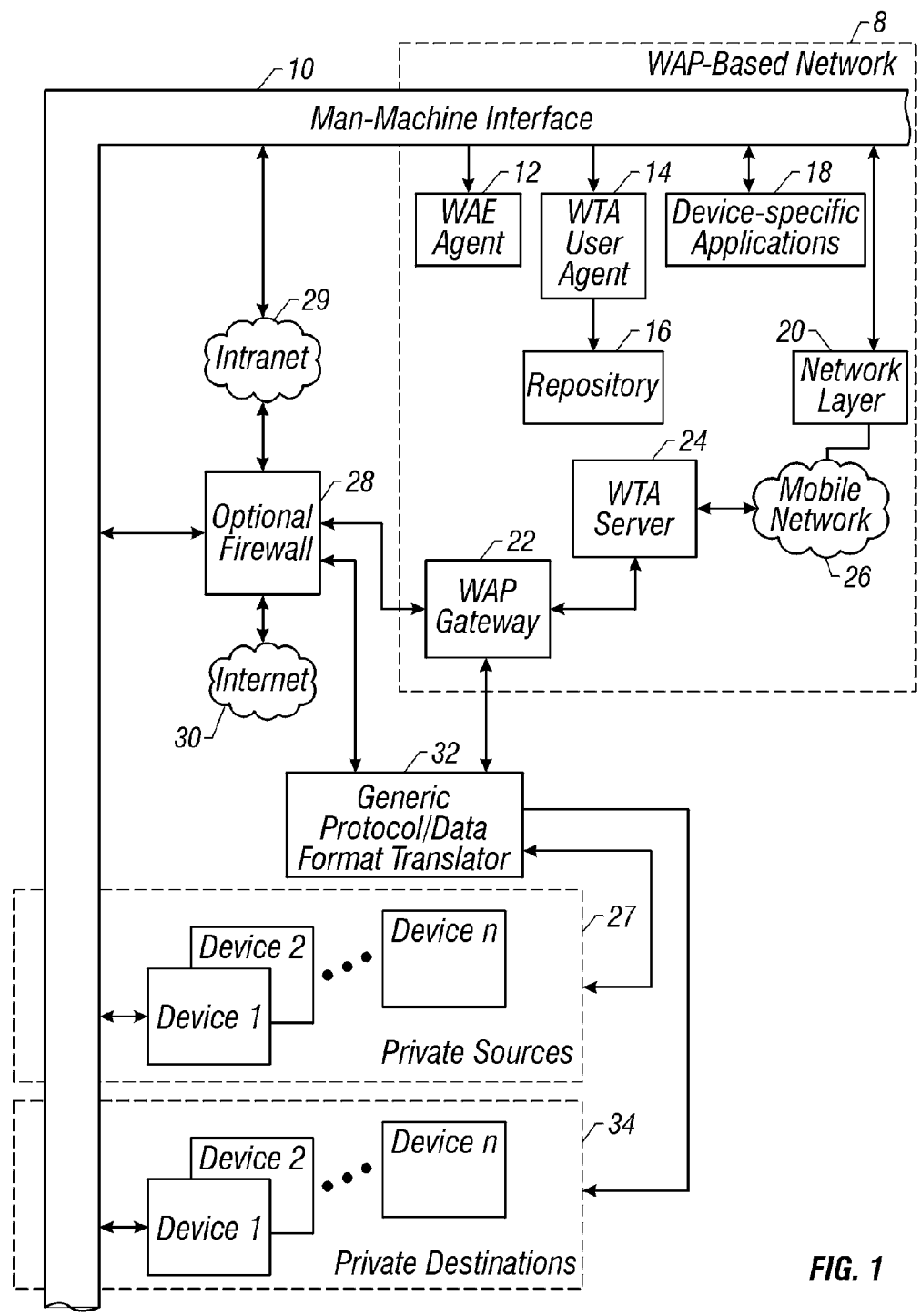
FIG. 1 is a block diagram illustrating the capability of the present invention to support various interfaces, including a representative wireless network, wire-based computer network, and specific source and destination devices.

FIG. 1 is a block diagram illustrating the generic types of interfaces that the present invention is capable of supporting. The representative wireless network 8 shown in FIG. 1 utilizes the Wireless Application Protocol (WAP). WAP is a wireless communication protocol standard defined by the WAP Forum, a consortium of wireless equipment manufacturers, wireless telephony providers, and others in the wireless communications and device industries. The WAP standard can be considered an umbrella standard, in that it actually comprises a suite of WAP Forum approved specifications that are specific to various wireless applications and/or device types. The WAP 1.1 Technical Specifications, comprising the following specifications, are hereby incorporated by reference herein for all purposes:

Wireless Application Protocol Architecture Specification, dated Apr. 30, 1998

Wireless Application Environment Overview, dated Jun. 16, 1999

Wireless Application Environment Specification, dated May 24, 1999

Wireless Markup Language Specification, dated Jun. 16, 1999

Binary XML Content Format Specification, dated Jun. 16, 1999

WMLScript Language Specification, dated Jun. 17, 1999

WMLScript Standard Libraries Specification, dated Jun. 17, 1999

WMLScript Statement of Intent, dated Apr. 30, 1998

WAP Caching Model Specification, dated Feb. 11, 1999

Wireless Session Protocol Specification, dated May 28, 1999

Wireless Transaction Protocol Specification, dated Jun. 11, 1999

Wireless Datagram Protocol Specification, dated May 14, 1999

WAP over GSM USSD Specification, dated May 31, 1999

Wireless Control Message Protocol Specification, dated May 14, 1999

Wireless Transport Layer Security Specification, dated Feb. 11, 1999

Wireless Telephony Application Interface Specification, dated May 31, 1999

Wireless Telephony Application Interface Specification, GSM Specific Addendum, dated Feb. 10, 1999

Wireless Telephony Application Interface Specification, IS 136 Specific Addendum, dated Apr. 30, 1999

Wireless Telephony Application Interface Specification, PDC Specific Addendum, dated Apr. 30, 1999

Copies of these specifications can be obtained on the Internet at www.wapforum.org/what/technical_1_1.htm.

Referring to FIG. 1, the message sources and destinations that interface with the present invention generally include a man/machine interface 10. Depending upon the device types involved, the man/machine interface may be a keyboard, number pad, control panel, monitor, indicator lights, switch panel, or in general, any mechanism that permits information to be entered by or displayed to a human operator or user. Within the representative WAP-based wireless network 8 shown in FIG. 1, the man/machine interface 10 interfaces to the WAE agent 12 and the WTA User Agent 14. The WAE agent is an element of the Wireless Application Environment, and the functions of the WAE agent are discussed in the Wireless Application Environment Overview and Wireless Application Environment specification described above. Similarly, the WTA User Agent is an element of the Telephony Application Interface, and its functions are described in the Telephony Application Interface Specification listed above. In general, these network elements support interaction with generic wireless devices and wireless telephony devices, respectively. For completeness only, FIG. 1 also shows other common elements of a WAP-based network, including a Repository 16, the Network Layer 20, the Mobile Network 25, the WTA server 24, and the portal to the WAP network with which the present invention interfaces, the WAP Gateway 22. For more detail on these elements of the WAP network, the reader is referred to the specifications listed above, particularly the Wireless Application Environment Overview, the Wireless Application Environment Specification, and the Telephony Application Interface Specification. These and the other WAP specifications listed above provide details concerning the features, functions, and interfaces of the various network elements and functions, some of which are shown in FIG. 1.

The generic communications protocol translator that is a preferred embodiment of the present invention is shown in FIG. 1 at block 32, with a two-way interface to the WAP Gateway 22, an intranet 29 or the Internet 30, either directly or through a firewall 28. As shown in FIG. 1, the protocol translator 32 may also have one- or two-way interfaces to multiple private sources 27 and private destinations 24.

The protocol translator 32 accepts messages from sources such as the WAP Gateway 22, the Internet 30 or an intranet 29 (directly or through a firewall 28) or any of multiple potential private sources 27, and is capable of translating the messages and then forwarding them back to the WAP Gateway 22, the Internet 30 or intranet 29, back to the private sources 27, or to any of the private destinations represented by block 34.

Messages received from the WAP gateway are likely to be encoded in one or more of the WAP protocols defined by the above specifications. Messages received from the other potential message sources shown in FIG. 1 may be in any of the following example protocols:

Distributed Process Control Protocol (DPCP), or another entrenched, customized and often proprietary protocol that has likely been customized for performance reasons and is thus not general purpose in nature.

a highly customized and proprietary protocol, including TCP/IP or Netware, wireless ASCII and other printer-type protocols.

Mobile Application Link, or MAL protocol, an open protocol related to the Personal Digital Assistant device category, which may utilize TCP/IP and HTTP as its primary file transfer mechanism but does not address the transformation of application data for suitability on the destination device.

other open or proprietary protocols.

This listing of potential protocols is intended to be a sample, rather than exhaustive listing of the types of incoming message protocols and outgoing message protocols that the present invention is capable of supporting. Incoming message protocol recognition is accomplished via assignment of specific port connections to a specific protocol. In other words, when a message is received upon a specific port, the present invention accepts the message and, as described in more detail below, routes it appropriately.

The private sources 27 from which the protocol translator can receive messages, and the private destinations 34 to which the protocol translator can forward messages are those devices whose communications capabilities the protocol translator can determine and with which the protocol translator can exchange meaningful information. Private sources 27 and private destinations 34 are intended to represent devices that communicate using a proprietary protocol or open protocol, such as one or more of the example protocols listed above. In other words, the present invention is capable of connecting to and communicating directly with an electronic device in its own language-even when that language is a proprietary language that is unique to the device, or a more standard language used by several devices and device types. In the context of this disclosure, the designation "private" source or destination refers to a device that communicates in a device-specific manner, and the device's communications interface does not utilize WAP, a private network of computers, or the Internet.

Figure 2:
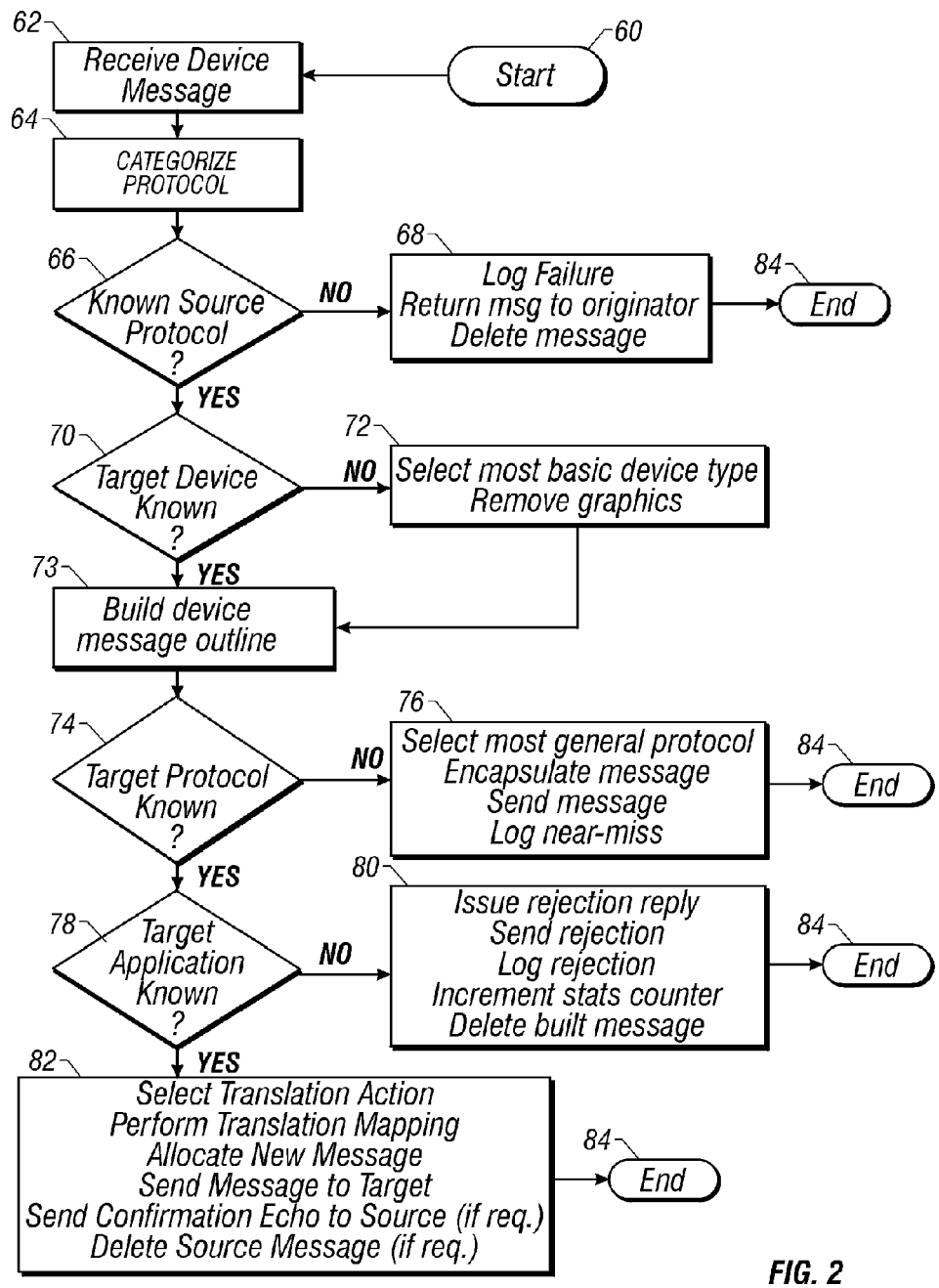
FIG. 2 is a flowchart showing the high level sequence of a sample transfer between two devices using a preferred embodiment of the present invention.

FIG. 2 is a diagram showing the high level functional flow of the present invention in a preferred embodiment. At startup 60, the present invention performs general maintenance and housekeeping tasks such as allocating memory and initializing network interfaces, in preparation to receive and translate information. At 62, the present invention has received a message. The first function that the present invention performs after receiving a message is to determine, at 64, which protocol was used to receive the incoming message (the "source protocol"). As described above, this is achieved via assignment of specific port connections to a specific protocol. At 66, the present invention determines whether the source protocol is known. If it is not, the present invention proceeds to block 68 and performs the tasks listed there. On the other hand, if the source protocol is a known protocol, the present invention continues to work on the message.

At 70, the present invention determines whether the target device (the destination) can be ascertained from the incoming message. If the target device cannot be determined from the incoming message, the present invention selects, at 72, a default basic target device and removes all graphics (if any) from the incoming message. After the target device is determined (or a default is selected), the present invention begins to work on constructing an outgoing message, as shown at 73.

The present invention then moves on to 74 to ascertain whether it recognizes the target device's communications protocol. If it does, the present invention continues on to block 78, where it checks to see if it can determine the target application on the target device. On the other hand, if the present invention does not know the target device's preferred protocol, it will select, at 76, a default general protocol, formulate the message, and log a near miss. The purpose of this logging function will be explained below.

At block 78, if the target application is known, the present invention moves on to translate and send the message at block 82. In addition, the present invention sends a confirmation echo back to the source (if required) and then deletes the message. At this point, the present invention is ready to process another received message.

In the embodiment shown in FIG. 2, if the present invention determines, at block 78, that the target application is not known, the message is rejected at 80 and the source is so informed. Alternatively, rather than rejecting the message at this point, practitioners of the present invention may elect to translate the message to the protocol determined in block 74, and send the message to the target device determined in block 70. This approach effectively assumes that the target device itself can direct the message to its proper internal application.

The logging functions shown in blocks 68, 76, and 80 are included to support potential diagnostic and upgrade activities that the user may desire at some point in the future. For example, if the diagnostic logs show that a particular source protocol or target device/protocol is repeatedly encountered but repeatedly logged as unknown, investigation and possible upgrade or modification to the present invention may be indicated to provide support for these protocols. The features of the present invention that allow for flexibility and ease of upgrade or modification to incorporate new and additional protocols are discussed in more detail below, in connection with FIG. 4.

Figure 3:
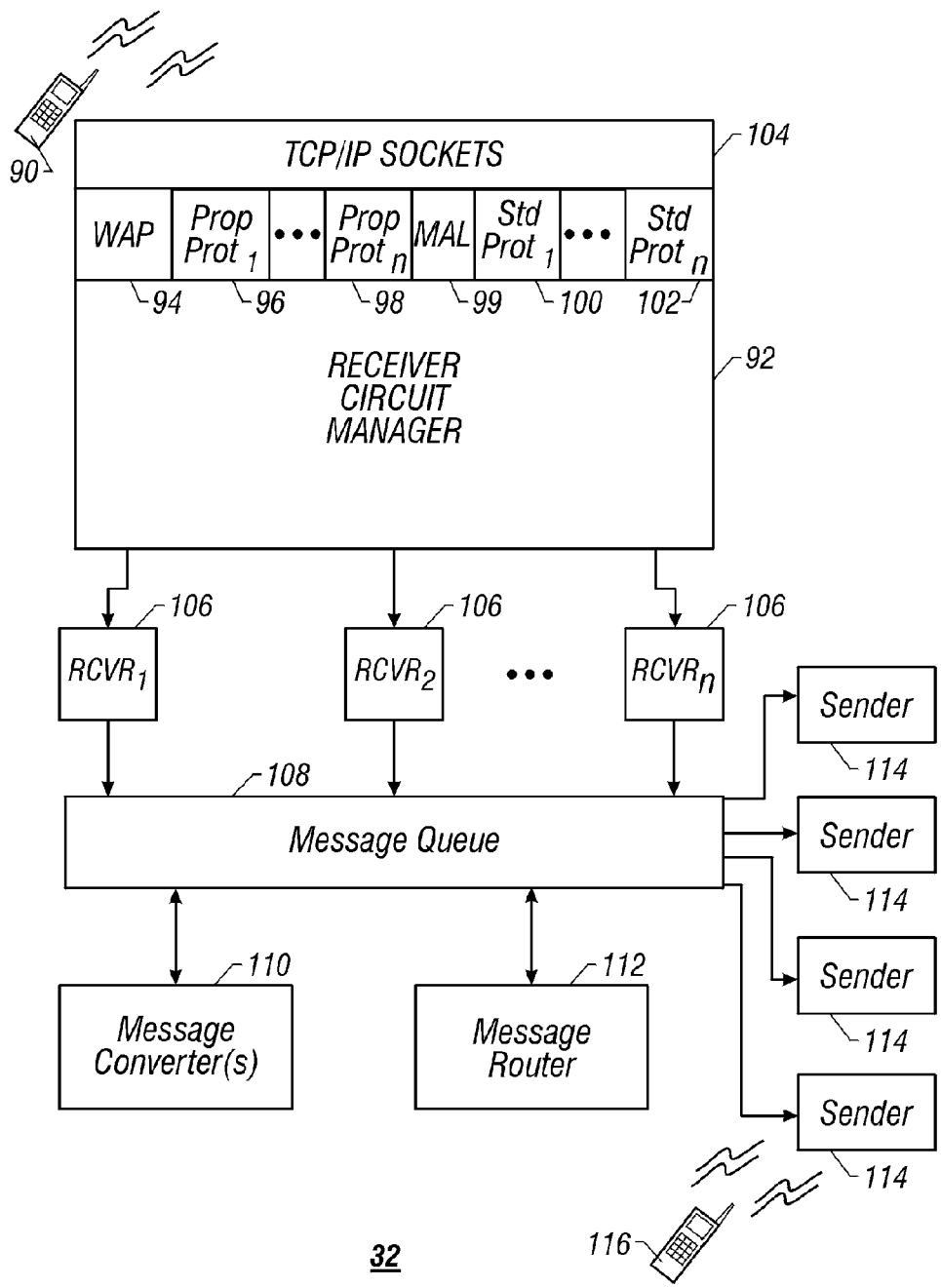
FIG. 3 is a high-level functional block diagram showing the data flow in a preferred embodiment of the present invention.

FIG. 3 is a block diagram of the protocol translator 32, depicted in an example where both the source and destination devices are typical wireless devices. Typical wireless device 90 generates a message, which is received by the protocol translator 32 via a TCP/IP socket-type interface 104. The TCP/IP socket interface 104 provides an interface to all the incoming message protocols that the protocol translator supports. For illustrative purposes only, supported incoming message protocols shown in FIG. 3 include Wireless Access Protocol (WAP) 94, Proprietary Protocols 96 and 98, Mobile Application Link (MAL) 99, and other Standard Protocols 100 and 102. Those skilled in the art will understand, after reading this specification or practicing the present invention, that the incoming message protocols that the present invention supports that are shown in FIG. 3 are for illustrative purposes only, and in no way should be considered to be an exhaustive list of the protocols that the present invention is capable of supporting.

Returning to FIG. 3, the receiver circuit manager 92 receives the incoming message, performs basic error and security checks, initiates the receiver process, and hands off the message to one of multiple receivers 106. Each receiver 106 accepts messages for further processing from the circuit manager 92, performs the tasks detailed below, and then places the message on the message queue 108 designated as directed to the message destination.

Each receiver 106 categorizes the incoming message protocol, performs second pass checking on the internal structure of the message, marks messages for rejection where appropriate, and then enqueues the message for routing.

The message queue 108 performs the message queue and synchronization task amongst all senders, receivers, router, and conversion processes. The message queue 108 grows/shrinks dynamically within a self-managed heap.

The message router 112 ascertains whether conversion is required by comparing source and destination type attributes, and then routes the message through the message queue 108 to the converter 110 when appropriate. The message converter 110 categorizes messages and then translates them into the appropriate destination format. The message converter 110 may be implemented on one processor, or it may be spread across several processors for loading purposes. Additionally, message conversion may comprise multiple identical conversion processes, or it may comprise different processes, again as required for the source and destination types and for load and queue balancing.

Once converted, the message is evaluated by the router 112 as to which destination protocol is to be used for routing the message out of the protocol translator 32. The router then forwards the message, again through the message queue 108, to the appropriate sender 114. As shown in FIG. 3, the present invention may include multiple senders 114, depending upon the outgoing message protocols and device types that the protocol translator supports. Senders 114 also include all hardware appropriate to support the physical transmission of the outgoing message, as required by the destination device and destination protocol.

Senders 114 then transmit the outgoing translated message via a wired or wireless interface to the destination device 116.

FIGS. 4A through 4E show the conversion and categorization functions of the message converter 110, in a preferred implementation that uses a poly-dimensional finite state automaton incorporating ten major discriminators. This preferred implementation is an extensible, maintainable design that enables incorporation of numerous future protocols, device types, and application formats without modification to the infrastructure. Moreover, new protocols, devices, and applications can be added with fewer errors and achieve better performance than is possible with conventional design techniques.

One important benefit of the use of state machine automata as a preferred implementation is that it renders the present invention extremely scalable. Moreover, the state machine automata implementation can be placed into silicon, resulting in a very fast and reliable translation method. Further, by incorporating flash memory technology, the silicon can be Areprogrammed@ in the field, enabling users to either load in supplied updates or develop their own modifications. Nevertheless, after reading this disclosure or practicing the present invention, those skilled in the art will recognize that alternative hardware and/or software embodiments that do not utilize the preferred finite state automaton implementation could be employed without departing from the present invention, even though such alternative implementations would be less advantageous in terms of scalability, performance, and ease of modification.

Similarly, those skilled in the art will understand, after reading this specification or practicing the present invention, that while this specification describes the finite state automaton as residing wholly within the message converter 110, alternative implementations where one or more stages of the finite state automaton (or equivalent implementations) might reside within the message router 112 will not depart from the present invention.

Figure 4A:
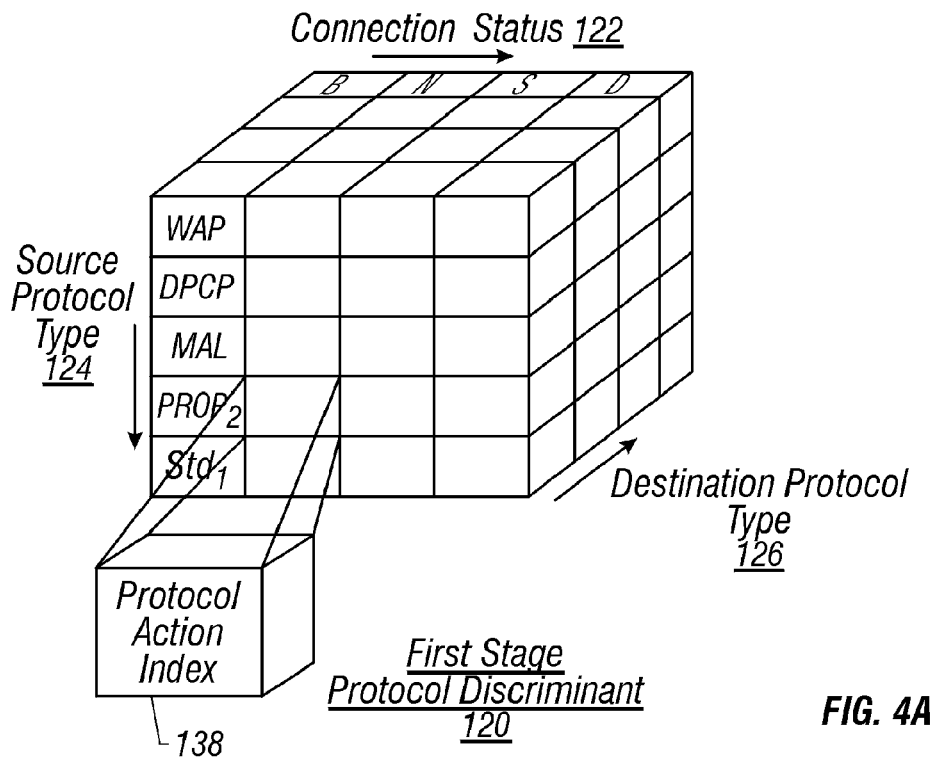
FIGS. 4A-4E show how the present invention uses finite state automata techniques to recognize, and categorize various communication protocol and device interfaces, and to convert information for effective transfer.

The inputs to the poly-dimensional finite state automaton include:

Inbound message memory block and address
Current automata state
Protocol Type on which inbound message arrived
Device Type from which inbound message originated
Application Type from which inbound message originated
Format Type from which inbound message originated (often implied by application type)
Connection status of both devices (connected/disconnected, online, offline)
Protocol Type on which outbound message must be sent
Device Type to which outbound message must be sent
Application Type to which outbound content must be transformed
Format Type to which inbound content must be transformed Turning to FIG. 4A, the first stage 120 of the poly-dimensional finite state automaton is a protocol discriminant. The protocol discriminant stage 120 selects a protocol action index 138 from a three-dimensional matrix based upon the connection status 122, the source protocol type 124, and the destination protocol type 126.

The protocol action index 138 is an integer or identifier that corresponds to a protocol variable of the form "x, y, z", wherein "x" comprises an integer or identifier that indicates the status of the connection link between the present invention and the source and/or destination devices, "y" comprises an integer or identifier associated with a category of similar source protocols, and "z" comprises an integer or identifier associated with a category of similar destination protocols.

To illustrate the derivation of the protocol action index, consider an example wherein a user desires to update an address in the address book of a Personal Digital Assistant-type device (PDA) using an address-book database application on a Personal Computer (PC). Assume, for this example, that the user's address book application is not internally supported by the PDA, and therefore, the present invention is required to facilitate the communication between the two devices. Suppose that the following non-exhaustive list of protocol categories are supported in the example embodiment of the present invention:

(1) Wireless Access Protocol (WAP)
(2) Mobile Application Link (MAL)
(3) DPCP (proprietary binary protocol)
(4) Internet Presence Protocol (IMPP)
(5) RSVP (a common receive/respond protocol)
(6) Starfish Software TrueSync Protocol
(7) Application-specific proprietary protocol A
(8) Application-specific proprietary protocol B
(9) Client-specific proprietary protocol A
(10) Client-specific proprietary protocol B The present invention determines, from the incoming message, the source protocol 124 and the destination protocol 126, and then selects the proper protocol categories to ascertain the y, z components of the protocol variable. To illustrate using the example provided above, assume that the address-book application on the user's computer (the source device) utilizes a protocol with characteristics similar to application-specific proprietary protocol A (number 7 on the above list), while the PDA utilizes a protocol with characteristics similar to application-specific proprietary protocol B (number 8 on the above list). Suppose that both the source and target devices are connected to the translator, corresponding to a connection status of "1". Suppose that the protocol action index "12" corresponds to the protocol variable "1, 7, 8". In other words, in this example, any time a source device having a protocol categorized as "application-specific proprietary protocol A" wants to communicate with a destination device having a protocol categorized as "application-specific proprietary protocol B," and both devices are currently connected, the present invention selects protocol action index "12".

Each protocol category may be comprised of a single protocol, or several similar protocols. In the preferred embodiment, two protocols are considered to be "similar" and grouped together in a single category (such as "application-specific proprietary protocol A") according to the following criteria, in descending order of importance:
 (1) Content encoded in ASCII/unicode vs. binary
 (2) Identical headers
 (3) For markup languages, the same set of descriptors
 (4) Same basic structure (e.g., a header and a body)
 (5) Regular expressions that are decomposed in the same way Those skilled in the art and familiar with communications protocols will understand that in specific implementations, practitioners of the present invention may choose to delete one or more of these criteria, rearrange their order of importance, or add other criteria not listed here to achieve certain behavior from the present invention. The list shown above is a preferred embodiment that will enable a generic translation capability; other protocol categorization criteria and approaches may be implemented without departing from the present invention.

Similarly, practitioners of the present invention may choose among various potential implementations of the connection status input. For example, in a preferred embodiment, one connection status identifier may be assigned to indicate that both the source and target devices are currently connected, another to indicate that the source, but not the target is connected, and yet another to indicate that the source is connected and the target is not, but the target is capable of being connected at some reasonable time in the future (e.g., where the target device is a wireless device with which a sender 114, might establish a connection via the WAP gateway 22). In this embodiment, all other inputs being equal, the present invention might choose three different actions based upon the connection status of the target device.

Finally, those skilled in the art will recognize that the order of the three components of the protocol variable described above is unimportant. In other words, a protocol variable of the form "x, y, z", where "x" comprises the destination protocol category identifier, "y" comprises the connection link status, and "z" comprises the source protocol category identifier would not depart from the present invention. This is true for each of the three-component variables described below in conjunction with the discussion of each stage of the finite state automaton.

Figure 4B:
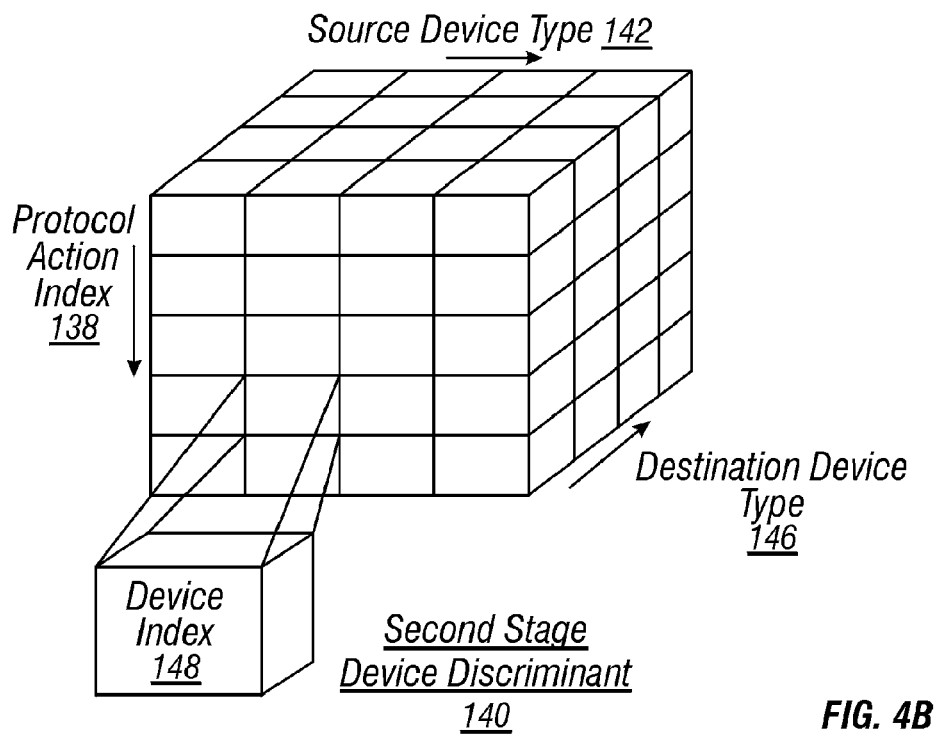

FIG. 4B shows the second stage of the poly-dimensional finite state automaton 140. The second stage 140 is a device discriminant wherein a device index 148 is selected, again from a three-dimensional matrix, based upon the protocol action index 138 determined in the first stage 120, the source device type 142, and the destination device type 146. The source device type 142 is derived from the connection port upon which the message arrives. The destination device type 146 is derived from various sources, depending upon the implementation. For example, depending upon the source protocol employed, the destination device might be identified using a URL-style naming convention within an HTTP header, or it might be in the message header or body.

The device index is an integer or other identifier that represents a device variable of the form "x, y, z" wherein "x" comprises the protocol action index described above, "y" comprises an integer or other identifier associated with a category of similar source devices, and "z" comprises an integer or other identifier associated with a category of similar destination devices. In the preferred embodiment, two devices are considered to be "similar," and thus grouped together within a category, when they accept the same type of data. For example, an embodiment of the present invention might include the following categories that comprise the y, z components of the device index:
 (1) ASCII-only capable devices
 (2) Bit-mapped capable devices with resolution A
 (3) Bit-mapped capable devices with resolution B
 (4) Nokia 9000il-type devices
 (5) Symbian devices
 (6) Palm Pilot family of devices This list is, of course, for illustration purposes only and should not be considered to be an exhaustive list of devices that the present invention is capable of supporting. Moreover, those skilled in the art will recognize that practitioners of the present invention may choose other criteria in addition to or in lieu of data similarity to categorize devices as "similar," without departing from the present invention.

Continuing with the example offered above, the second stage of the finite state automaton might select a device index of "6", which, again, corresponds to a device variable of the format x, y, z. In this case, x equals a protocol action index of "12" (selected in the prior stage); y equals source device type category of "3" (which is the proper category for the source device, a personal computer); and z equals a target device type category of "6" (corresponding to the target device, a PDA).

Figure 4C:
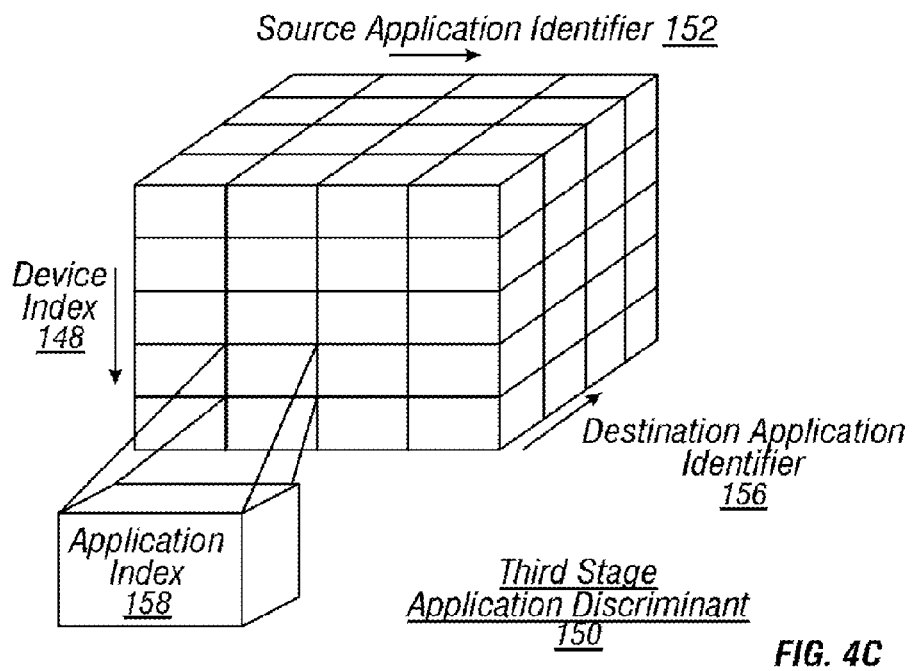

The third stage 150 of the poly-dimensional finite state automaton, shown in FIG. 4C, is an application discriminant. The application discriminant stage 150 selects an application index 158 from a three-dimensional matrix based upon the device index 148 determined in the previous stage 140, the source application identifier 152, and the destination application identifier 156. Both the source application identifier 152 and the destination application identifier 156 are determined from the incoming message. Like the prior indices, the application index is an integer that corresponds to a variable of the form x, y, z, where x is the device index 148 determined in the previous stage 140, and y and z are category identifiers corresponding to the application categories appropriate for the source and target applications. Source and target applications might include, but are not limited to, the following categories:

(1) XML
(2) HTML
(3) HDML
(4) Text
(5) EPOC
(6) FAT16
(7) Agenda- and calendaring-type applications on handheld devices
(8) Database-type applications on handheld devices
(9) Mobile Application Link database applications
(10) Applications using Wireless Access Protocol file structure In the preferred embodiment, two applications are considered to be similar and are grouped into a single category when the two applications use the same format to describe the content of records, files, or other objects which are used to encapsulate the application's smallest complete data representation. Like the other stages described herein, practitioners of the present invention may choose other criteria for grouping similar applications without departing from the present invention, based upon the designer's goals relating to the specific behavior of the present invention.

Figure 4D:
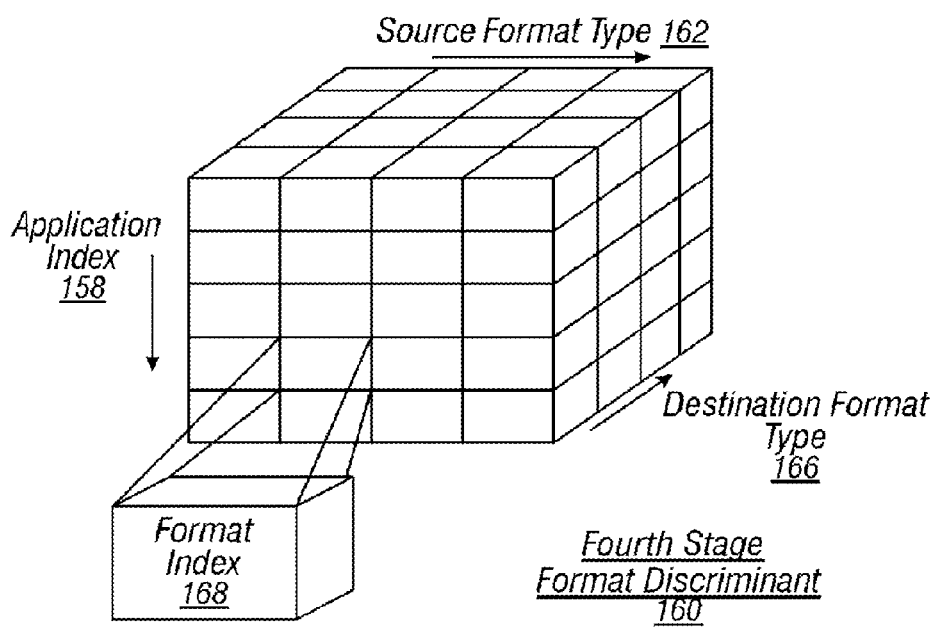
Figure 4E:
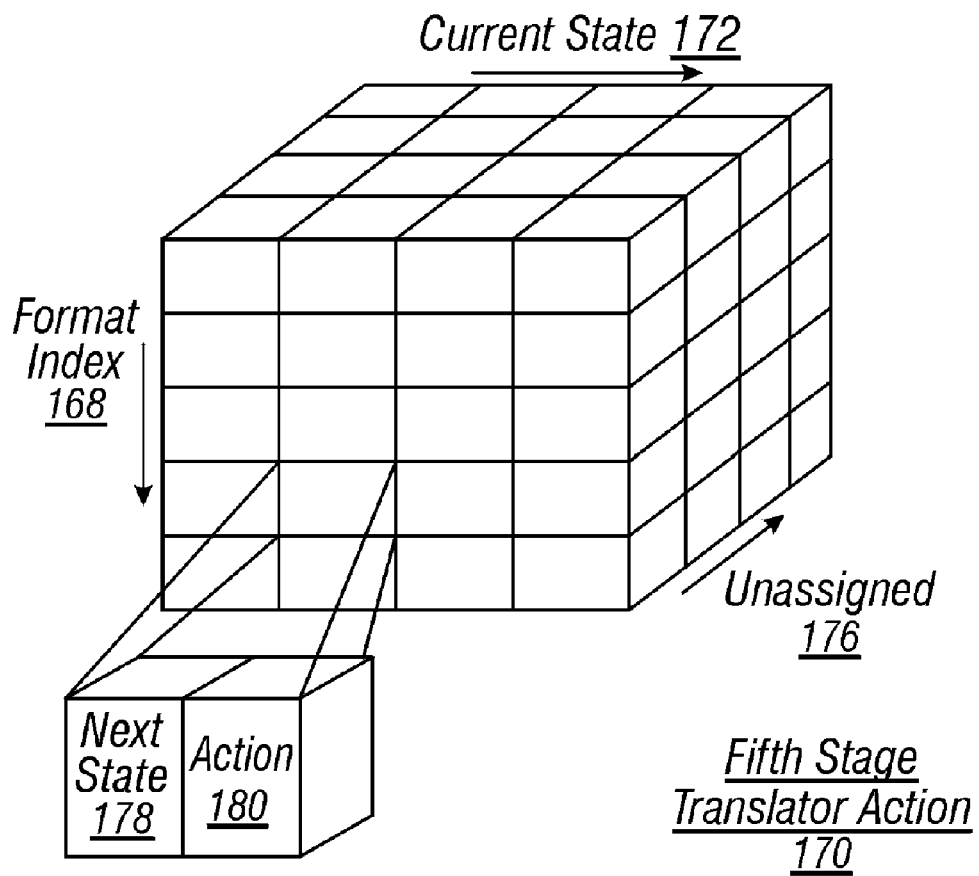

FIG. 4D shows the fourth stage 160 of the poly-dimensional finite state automaton, which is a format discriminant. The format discriminant stage 160 selects a format index 168 from a three-dimensional matrix based upon the application index 158 determined in the previous stage 150, the source format type 162, and the destination format type 166. Both the source format type 162 and the destination format type 166 are determined from the incoming message. The format index is an integer or identifier that corresponds to a format variable of the form "x, y, z", where "x" is the application index 158 determined in the previous stage 150, "y" corresponds to the data format category identifier that the source data format falls into, and "z" corresponds to the data format category that the data must be formatted in for the target. Data format categories may include, but are not limited to, the following data formats:

(1) 1-byte character data
(2) 2-byte character data
(3) Unsigned 32-bit integer
(4) Little Endian
(5) Big Endian
(6) Signed 32-bit integer
(7) IEEE floating point
(8) 64-bit integer Finally, FIG. 4E shows the final stage 170 of the poly-dimensional finite state automaton, which is the action selector. The action selector stage 170 selects the final output 180, termed the "action" of the automata. The action 180 comprises a series of executable instructions used by the generic protocol translator 32 to modify the incoming message according to the target, its source, the application(s) that created the message content, and connection status of the cooperating devices. Actions 180 may include, but are not limited to, instructions to do nothing, to modify the incoming message, to send a message to the destination device, to reject the incoming message, to perform a given type of transformation on a message's content, or to send a message to the source device. In addition, the action 180 may include internal housekeeping-type instructions such as allocating and de-allocating resources and logging information.

The action 180, along with the next state 178 of the finite state automata, is selected from the format index 168 determined in the previous stage 160, the current state 172 of the finite state automaton, and potentially, an as-yet-unassigned variable 176. Unassigned variable 176 is included in the preferred embodiment shown in FIG. 4 to provide the present invention with its significant flexibility, speed and long term maintainability. When variable 176 is unassigned, the action selector 179 comprises a two-dimensional matrix from which the action 180 and next state 178 are selected as a function of the format index 168 and current automata state 172. However, additional actions 180 and next states 178 can be defined and selected by assigning indices or other values to unassigned variable 176.

The preferred embodiment of the present invention chooses one or more of these actions as a result of proceeding through the various stages of the poly-dimensional finite state automaton. As is evident from FIG. 4E, variable 176 can be defined such that the action selected is one or more of these actions, or a new action.

Variable 176 provides for extension of the supported protocol and data format sets in an evolutionary fashion rather than requiring knowledge of them during the translator code design phase. The only time software changes are required is if an entirely new form of translation is required, such as might occur when a new data type (e.g. floating point, integer, string, ASCII, etc.) is defined. Finally, while FIGS. 4A-4E depict the various stages of the poly-dimensional finite state automaton as operating in sequence, using the output from a previous stage, practitioners of the present invention may choose an alternative implementation. For example, practitioners of the present invention may choose to use only one or some of the various stages, individually or together, using predefined inputs that are not determined "on the fly" as shown in FIGS. 4A-4E. Those skilled in the art will recognize that using the stages in a pipeline, as shown in FIGS. 4A-4E, results in a more flexible and robust design solution, but also forces more design effort up front.

Figure 5A:
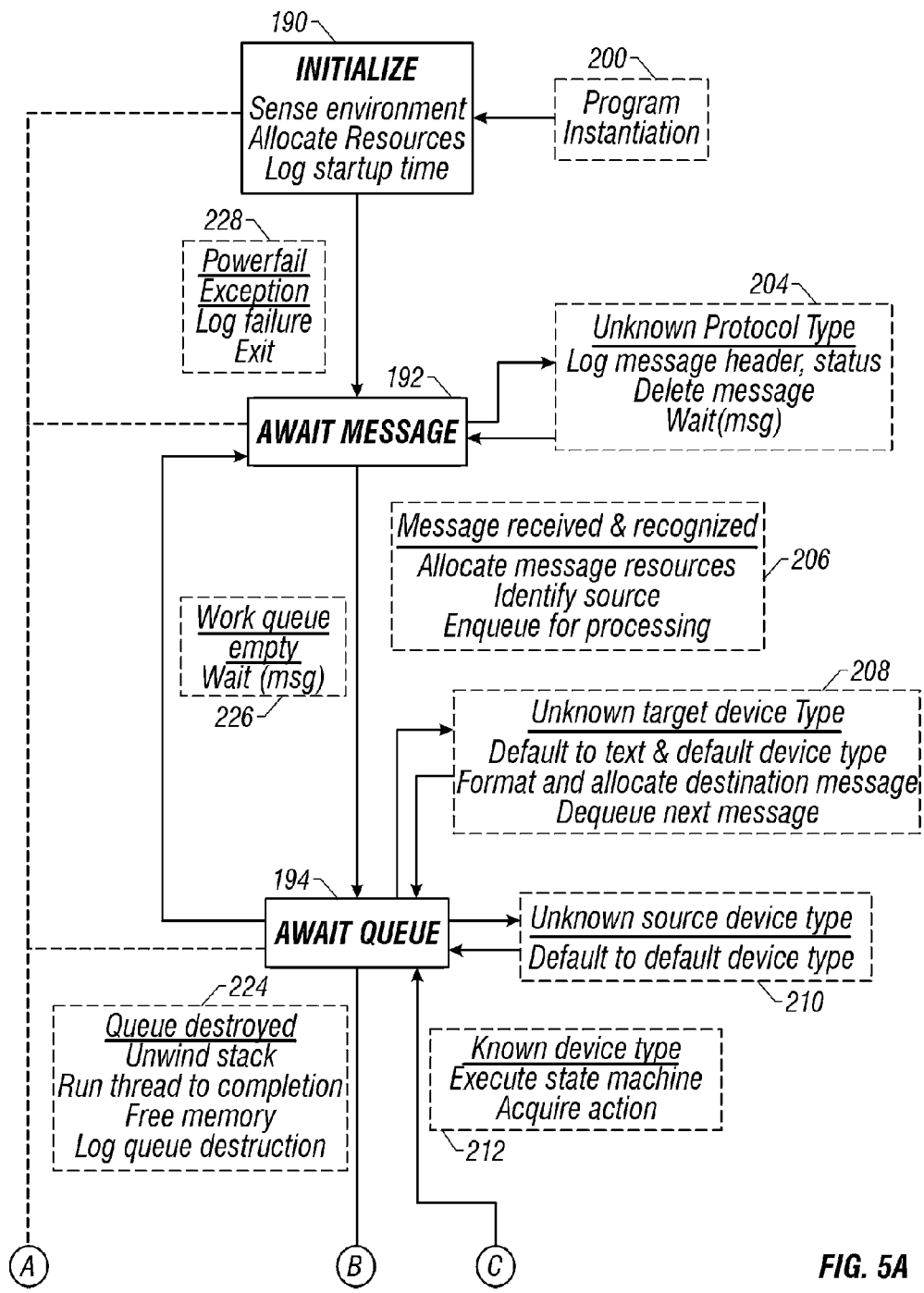
FIGS. 5A and 5B detail the behavior of a preferred embodiment of the present invention from a state-based perspective.
Figure 5B:
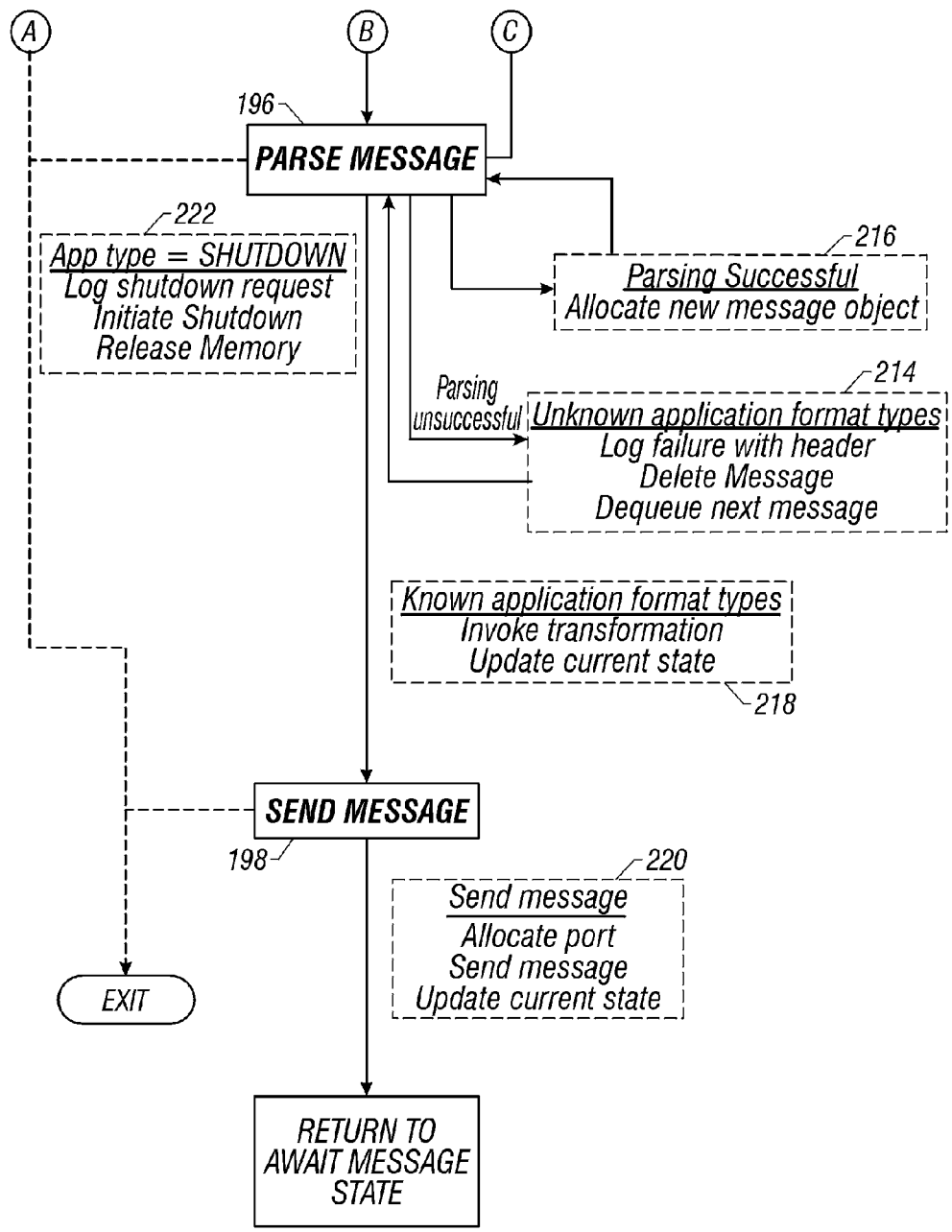
Figure 1:
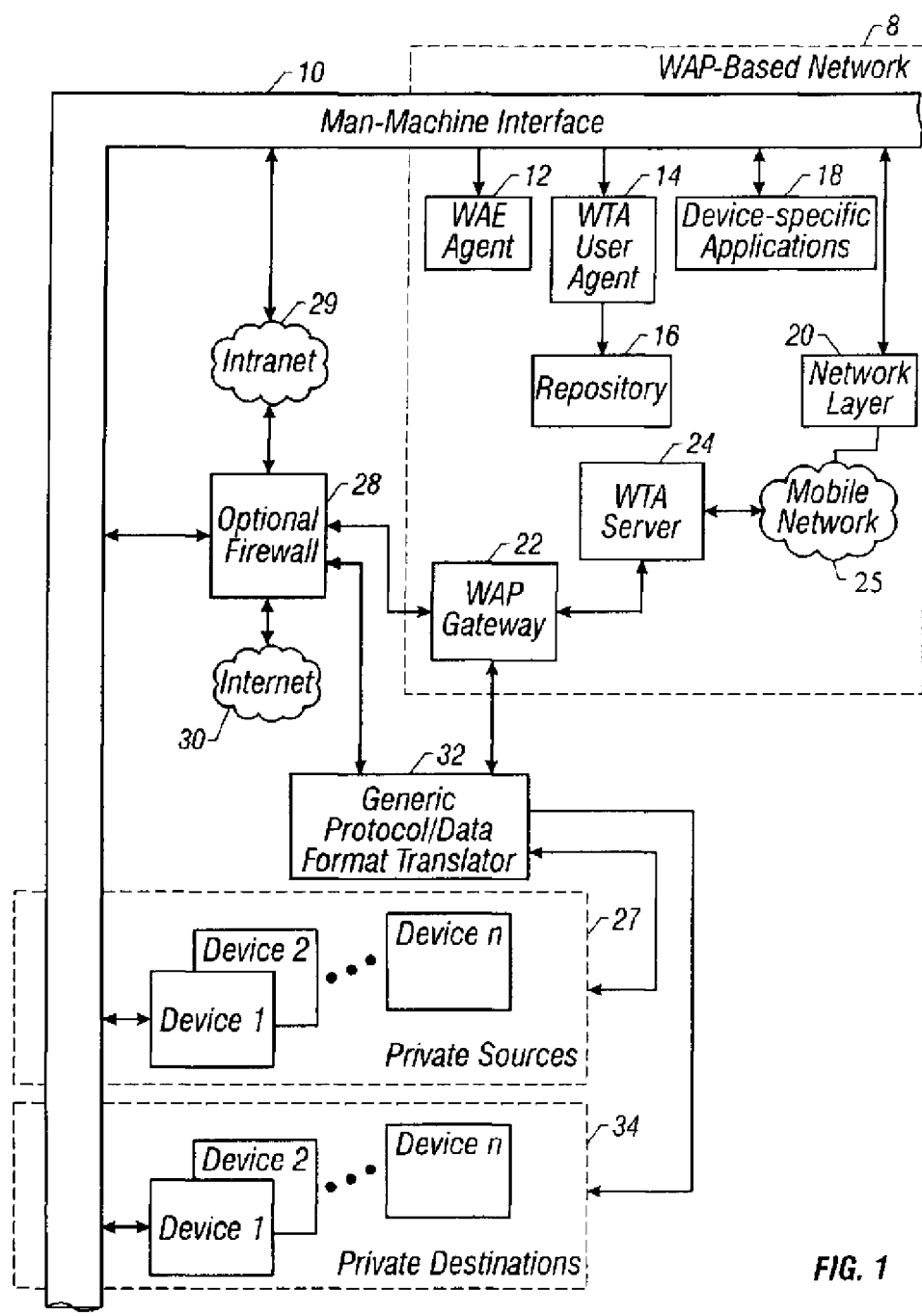

Whereas FIGS. 4A-4E provide a static look at the derivation of the behavior of the present invention, FIGS. 5A and 5B provide a dynamic runtime look at the behavior of the invention, from a state driven perspective, that is similar to but more detailed than FIG. 2.

In FIG. 5A, the present invention initializes at 190. Initialization is prompted either by a network administrator or similarly authorized individual or program executing a "run" statement, 200. At initialization, the present invention performs the functions listed in block 190.

At the end of initialization, the present invention enters the "await message" state 192. In the "await message" state, the present invention waits for a message until the wait status is changed due to a successfully received message. When a message arrives, the present invention is driven to the "await queue" state 194 where it maps the received message into the local address space initialized in the previous step. The present invention then evaluates the message as described above in conjunction with FIG. 2. As described in connection with FIG. 2, and shown again in FIG. 5A at 204, if the incoming message protocol is unknown, the message is rejected and deleted, the rejection logged, and the present invention returns to the "await message" state at 192. On the other hand, if the source protocol is recognized, the message is processed further as shown at 206.

As shown in FIG. 5A, one of the functions performed at 206 is to identify the source and target device types. If the source device is not known, the present invention will select a default source device and continue with the message, at 210.

If the target device is not known, in a preferred embodiment, the present invention converts the incoming message to a textual format, and selects a default target device, as a lowest common denominator "best effort" condition, as shown at 208. The present invention remains in the "await queue" state at 194 until all messages have been processed from the internal work queue. The present invention then continues with the default device(s) as "known" devices for the state machine, which is executed and an action acquired at 212.

In some circumstances, practitioners of the present invention may choose to forgo the default actions described above, and simply reject the message, log the failure, empty the message queue, and return to the "await message" state at 192. Similarly, practitioners of the present invention may choose to determine, at 206, the connection status of the target device. If the destination device is not connected and the present invention has no way to determine whether the destination device will be connected at some reasonable point in the future, practitioners of the present invention may choose, for performance reasons, to reject the incoming message, empty the queue, log the appropriate information, and return to the "await message" state at 192.

Continuing with FIG. 5A, where the source and target device types are known (or defaults have been selected, as described above), the present invention proceeds to 212, where the poly-dimensional finite state automata is executed and an action is acquired, as described in connection with FIGS. 4A-4E. When the target device, protocol, and application are known, parsing should be successful, and the message is ready for conversion to its destination format. The incoming message is then parsed and converted as shown at 196, 216, and 218, on FIG. 5B. The present invention enters the send message state 218 and performs the tasks associated with sending a message, shown at 220. After the destination message is sent, the present invention returns to the "await message" state at 192.

On the other hand, parsing may be unsuccessful where the target application cannot be determined. That case is shown at 214. In a preferred embodiment, when the target application is unknown, the present invention rejects the message, logs the appropriate information, de-queues the next message(s) associated with that target device/application, and returns to the "await message" state at 192.

Those skilled in the art will understand that actions other than sending a text-only message when a target device or target protocol cannot be ascertained can be selected without departing from the present invention. Similarly, practitioners of the present invention may choose to send a message (rather than reject it, as discussed above) where the target device and protocol are known, but the target application cannot be ascertained. Those skilled in the art will understand that variations such as these may be practiced without departing from the present invention.

As is evident from the above discussion and from examination of FIGS. 5A and 5B, blocks 222, 224 and 228 address error or shutdown conditions which can occur asynchronously with operation of the invention. They all force the present invention to transition from the current state to an exit condition. Block 226 indicates that when the work queue is empty, (i.e., when all incoming messages have either been processed and sent or have been rejected) the present invention returns to the "await message" state 192.

The following code fragment, offered for illustration only, demonstrates the higher-level functioning of the present invention. In this example, low level design details such as specific memory management techniques are excluded, to avoid obfuscation of the primary functions of the present invention. Those skilled in the art are familiar with and capable of implementing various well-known approaches to fill in these detailed design issues. The high-level code fragment shown below comprises a preferred implementation of the following general functional capabilities and features of the present invention:

Network connection management
Message rejection
Data format transformation
Message header translation
Message content translation
Memory management
Error reporting
Example Code Fragment:

```
/* Sense environment (e.g. memory available, O/S version, processor, I/O
ports available) */
/* Set up I/O ports based on configuration details */
/* Initialize memory region for gateway */
/* Initialize status and other internal structures for logging purposes */
/* Allocate screen region on any console device for interactive status
logging
*/
/* Spawn master circuit process */
/* Spawn receiver and sender processes */
/* Create internal queuing mechanism */
/* Spawn traffic router function */
/* Create synchronization elements */
/* Await first message */
/* Repeat the following forever */
check wait status:      /* Wait not satisfied, continue waiting*/
/*Wait satisfied, determine why based on wait status */
switch wait status:     /*map received message into local address space*/
Do_nothing:        /* take no action */
Establish_circuit:     /* save requisite identifier information, formally
accept connection, spawn new receiver task and hand off connection */
Destroy_circuit:    /* Deallocate socket id, clean up memory */
Build_rejection:    /* allocate memory, copy base header to reply,
upgrade status fields, enqueue message for sending */
Build_target:           /* Allocate memory, fill in base fields from
originate message, enqueue message for parsing */
ASCII_Big_Little:   /* Transform big-endian into little endian format */
ASCII_Little_Big:   /* Transform little-endian into big-endian format */
Map_headers:        /* Based on device type, app type, protocol type,
transform necessary fields from source message into appropriate
destination fields */
Map_content:        /* Based on device type, app type, protocol type,
transform content data into destination content body */
Allocate_memory:    /* Calculate requisite destination memory size and
allocate it*/
Free_memory:       /* Return used space to local heap */
Send_Msg:          /* Send message to destination. Log any errors. */
Update_State:      /* assign current state to next state value */
Otherwise:         /* unknown action and thus internal state machine
error. Log
serious error to console and log file */
Buffer_overflow:     /* Log failure to log file and console */
Otherwise:           /* Log failure to log file and console */
/* end switch on wait result */
```

The present invention is a generic protocol translator that translates information from a source device to a destination device. The present invention comprises a receiver circuit manager that further comprises one or more interface sockets, each interface socket is assigned a supported source protocol. The receiver circuit manager receives information from a source device that is intended for a destination device through the interface sockets. The present invention further comprises one or more receivers that receive information from the receiver circuit manager. Additionally, the present invention comprises one or more message converters convert the information to the destination format using a conversion process. The message converters are extensible and can be reprogrammed in the field to support other protocols, device types, and applications. The conversion process uses a poly dimensional finite state automaton that further comprises a multi-stage pipeline comprising a first stage and a plurality of subsequent stages. Each stage of said multi-stage pipeline further comprises a matrix where a result is obtained as a function of one or more input variables, where one of the input variables of each subsequent stage further comprises the result from a prior stage. The present invention additionally comprises a message router that determines which destination protocol is appropriate for the information. And, the present invention includes one or more message senders that transfer the information in the destination format and protocol to the destination device.

Other embodiments of the invention will be apparent to those skilled in the art after considering this specification or practicing the disclosed invention. The specification and examples above are exemplary only, with the true scope of the invention being indicated by the following claims.

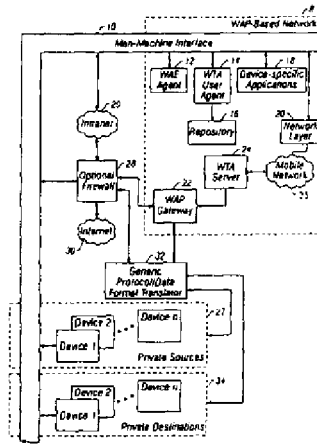

What is claimed is:

1. A method, comprising:
a communication device receiving a message that includes first content specified in a first language;
the communication device generating second content that is specified in a second language, wherein said generating second content includes translating the first content from the first language to the second language using a poly-dimensional finite state machine having three or more different inputs, and wherein the three or more different inputs include an input that is indicative of the second language; and
the communication device sending a message that includes the generated second content.

2. The method of claim 1,
wherein the received message further includes a first header indicative of a first data format; and
wherein the sent message further includes a second header that is the same as the first header.

3. The method of claim 2, wherein the first data format is selected from the group consisting of 2-byte character, unsigned 32-bit integer, little endian, and IEEE floating point.

4. The method of claim 1,
wherein the received message further includes a first header indicative of a first protocol; and
wherein the sent message further includes a second header indicative of a second protocol that is distinct from the first protocol.

5. The method of claim 4, further comprising:
the communication device using the poly-dimensional finite state machine to generate the second header based at least in part on the first header.

6. The method of claim 4, wherein the first protocol is a wireless communication protocol.

7. The method of claim 1, wherein the first language is a markup language.

8. The method of claim 1, wherein the first language is an application-specific language.

9. The method of claim 1,
wherein the received message further includes a first header that is indicative of a first data format;
wherein said generating second content comprises translating the first content from the first language to the second language using a content translation stage of the poly-dimensional finite state machine; and
wherein the sent message further includes a second header that indicates a second data format that is distinct from the first data format, wherein the second header is generated by a header generation stage of the poly-dimensional finite state machine.

10. The method of claim 9, wherein said generating second content comprises the content translation stage of the poly-dimensional finite state machine using, as an input, an output of the header generation stage of the poly-dimensional finite state machine.

11. A device, comprising:
a processor; and
memory coupled to the processor, the memory having instructions stored thereon that are executable by the device to cause the device to perform operations including:
receiving a first message that includes a first header and a first content body;
generating a second content body by translating the included first content body using a poly-dimensional finite state machine having three or more different inputs; and
transmitting a second message that includes the generated second content body.

12. The device of claim 11,
wherein the operations further include generating a second header that is distinct from the first header; and
wherein the second message further includes the generated second header.

13. The device of claim 12,
wherein the first header is indicative of a first data format; and
wherein the operations include generating a second header that is indicative of a second data format that is distinct from the first data format.

14. The device of claim 12,
wherein the first header is indicative of a first protocol; and
wherein the operations include generating a second header that is indicative of a second protocol that is distinct from the first protocol.

15. The device of claim 11,
wherein the poly-dimensional finite state machine includes a plurality of stages; and
wherein the operations include generating the second content body by translating the first content body using a content translation stage of the poly-dimensional finite state machine.

16. The device of claim 15,
wherein the first header is indicative of a first protocol;
wherein the operations further include using a protocol translation stage of the poly-dimensional finite state machine to generate a second header that is indicative of a second protocol that is distinct from the first protocol; and
wherein the transmitted second message further includes the generated second header.

17. The device of claim 16,
wherein the first header is further indicative of a first data format; and
wherein the operations further include using a format translation stage of the poly-dimensional finite state machine to generate a portion of the second header that is indicative of a second format that is distinct from the first format.

18. The device of claim 17, wherein the generating the second content body includes the content translation stage of the poly-dimensional finite state machine using, as an input, an output of the protocol translation stage of the poly-dimensional finite state machine.

19. The device of claim 18, wherein the generating the second header includes the protocol translation stage of the poly-dimensional finite state machine using, as an input, an output of the format translation stage of the poly-dimensional finite state machine.

20. The device of claim 11,
    wherein the generating the second content body includes translating the first content body from a first language to a second language; and
    wherein the three or more different inputs include an input that is indicative of the second language.

21. An article of manufacture including a non-transitory computer-readable memory medium having instructions stored thereon that, in response to execution by a device, cause the device to perform operations comprising:
    receiving a message that includes first content specified in a first language;
    generating second content that is specified in a second language, wherein said generating includes translating the included first content from the first language to the second language using a poly-dimensional finite state machine having three or more different inputs, and wherein the three or more different inputs include an input that is indicative of the second language; and
    sending a message that includes the generated second content.

22. An apparatus comprising:
    first means for receiving a first message that includes a first header and a first content body;
    second means for generating a second content body by translating the included first content body using a poly-dimensional finite state machine that is configured to translate the included first content body based at least in part on three or more different inputs; and
    third means for transmitting a second message that includes the generated second content body.

* * * * *

UNITED STATES PATENT AND TRADEMARK OFFICE
CERTIFICATE OF CORRECTION

PATENT NO.         : 8,341,281 B2
APPLICATION NO.    : 12/875993
DATED              : December 25, 2012
INVENTOR(S)        : Taylor It is certified that error appears in the above-identified patent and that said Letters Patent is hereby corrected as shown below:

Delete the Title Page and substitute the attached title page.

Title Page 2, in Item (56), under "OTHER PUBLICATIONS", in Column 1, Line 6, delete "Ltd," and insert -- Ltd., --, therefor.

Title Page 2, in Item (56), under "OTHER PUBLICATIONS", in Column 2, Line 6, delete "Ltd," and insert -- Ltd., --, therefor.

In the Drawings, delete drawing sheet 1, and substitute the attached drawing sheet 1 containing figure 1.

In the Specifications:

In Column 1, Line 24, delete "cables 3) by modem dial-up" and insert -- cables, 3) by modem dial-up, --, therefor.

In Column 3, Line 5, delete "DESCRIPTION" and insert -- BRIEF DESCRIPTION --, therefor.

In Column 5, Line 17, delete "private destinations 24." and insert -- private destinations 34. --, therefor.

In Column 8, Line 42, delete "formed" and insert -- formed. --, therefor.

In Column 9, Line 4, delete "Internet Presence Protocol" and insert -- Instant Messaging and Presence Protocol --, therefor.

In Column 9, Line 10, delete "B" and insert -- B. --, therefor.

In Column 9, Line 43, delete "way" and insert -- way. --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,341,281 B2

In Column 10, Line 41, delete "devices" and insert -- devices. --, therefor.

In Column 11, Line 17, delete "structure" and insert -- structure. --, therefor.

In Column 11, Line 51, delete "integer" and insert -- integer. --, therefor.

In Column 12, Lines 8-9, delete "action selector 179" and insert -- action selector 170 --, therefor.

In Column 13, Line 33, delete "message state 218" and insert -- message state 198 --, therefor.

United States Patent
Taylor (12)

(10) Patent No.: US 8,341,281 B2
(45) Date of Patent: *Dec. 25, 2012

(54) GENERIC COMMUNICATIONS PROTOCOL TRANSLATOR

(75) Inventor: Rebecca S. Taylor, Austin, TX (US)

(73) Assignee: Lubec Campobello LLC, Wilmington, DE (US)

( * ) Notice: Subject to any disclaimer, the term of this patent is extended or adjusted under 35 U.S.C. 154(b) by 112 days.

This patent is subject to a terminal disclaimer.

(21) Appl. No.: 12/875,993

(22) Filed: Sep. 3, 2010

(65) Prior Publication Data
US 2011/0004694 A1 Jan. 6, 2011

Related U.S. Application Data

(63) Continuation of application No. 10/711,173, filed on Aug. 30, 2004, now Pat. No. 7,792,981, which is a continuation of application No. 09/442,683, filed on Nov. 18, 1999, now Pat. No. 6,785,730.

(60) Provisional application No. 60/120,160, filed on Feb. 16, 1999.

(51) Int. Cl.
*G06F 15/16* (2006.01)
(52) U.S. Cl. ........ 709/230; 709/246; 707/708; 707/756; 707/761; 707/706; 707/716; 715/264; 704/2; 704/8
(58) Field of Classification Search .......... 709/230, 709/246, 219, 227, 225, 250
See application file for complete search history.

(56) References Cited

U.S. PATENT DOCUMENTS

| | | |
|---|---|---|
| 4,301,443 A | 11/1981 | Sternberg et al. |
| 4,797,842 A | 1/1989 | Nackman et al. |
| 4,821,224 A | 4/1989 | Liu et al. |
| 4,903,026 A | 2/1990 | Tiemann et al. |
| 5,073,852 A | 12/1991 | Siegel et al. |
| 5,410,675 A | 4/1995 | Shreve et al. |
| 5,619,650 A | 4/1997 | Bach et al. |
| 5,655,001 A | 8/1997 | Cline et al. |
| 5,666,553 A | 9/1997 | Crozier |
| 5,680,552 A | 10/1997 | Netravali et al. |
| 5,694,428 A | 12/1997 | Campana, Jr. |
| 5,708,828 A | 1/1998 | Coleman |

(Continued)

FOREIGN PATENT DOCUMENTS

EP 0821507 1/1998

(Continued)

OTHER PUBLICATIONS

Official Action in Japanese Application No. 2000-600172 issued Sep. 15, 2009, 3 pages. English Translation Available, 2 pages.

(Continued)

*Primary Examiner* — Jude Jean Gilles

(57) ABSTRACT

The present invention discloses a generic protocol translator (32) that translates information from a source device to a destination device. The generic protocol translator (32) includes a receiver circuit manager (92) that receives information from a source device that is intended for a destination device through one or more interface sockets (104). The present invention also includes one or more receivers (106) receive information from the receiver circuit manager. Further included are one or more message converters (110) that convert the information to the destination format using a conversion process. Additionally included is a message router (112) that determines which destination protocol is appropriate for the information. And, the present invention includes one or more message senders (114) that transfer the information in the destination format and protocol to the destination device.

22 Claims, 8 Drawing Sheets